3 Sheets—Sheet 1.
A. J. HURTU & V. J. HAUTIN,
Assignors, by mesne assignments, to HAUTIN SEWING MACHINE CO.
SEWING MACHINE.
No. 10,125. Reissued May 30, 1882.
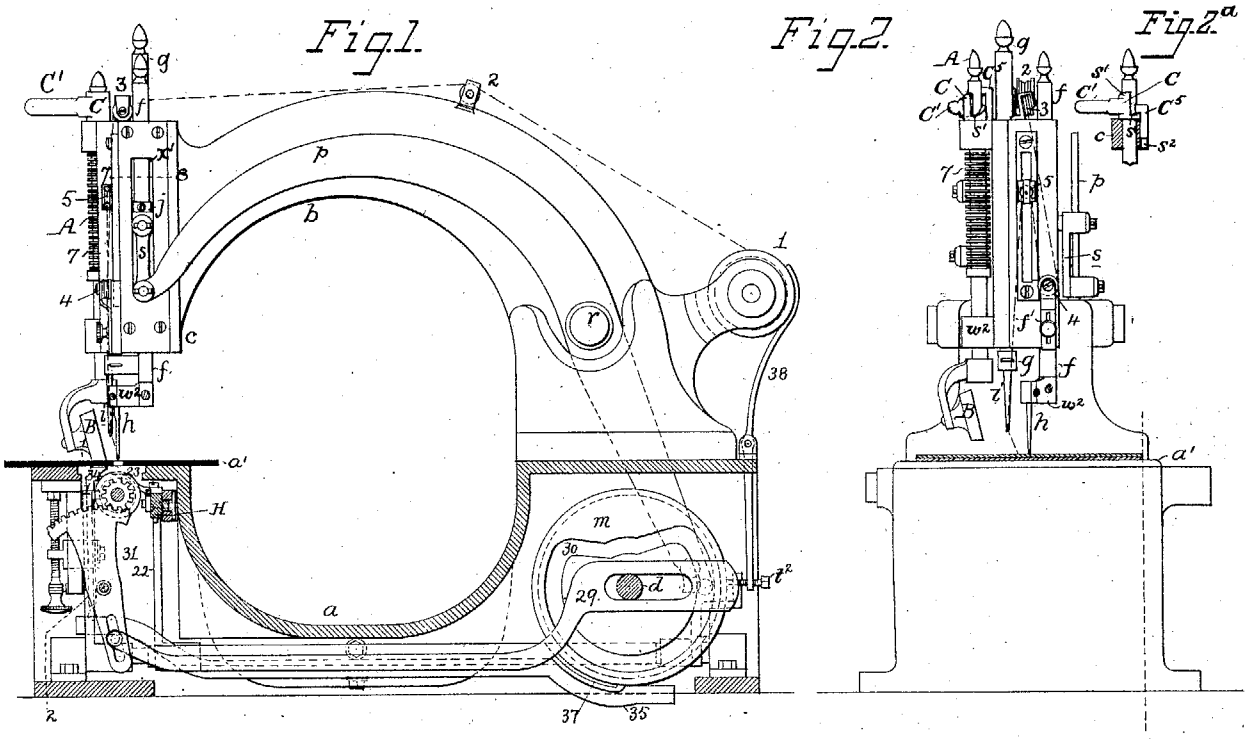
Attest:
Courtney A. Cooper
A. L. Ewin.
Auguste Jacques Hurtu
Victor Joseph Hautin
By their attorney
Charles E. Foster 3 Sheets—Sheet 2.

A. J. HURTU & V. J. HAUTIN,

Assignors, by mesne assignments, to HAUTIN SEWING MACHINE CO.

SEWING MACHINE.

No. 10,125. Reissued May 30, 1882.

Attest:
Courtney A. Cooper.
Jas. L. Ewin.

Auguste Jacques Hurtu
Victor Joseph Hautin
By their attorney
Charles E. Foster

3 Sheets—Sheet 3.

A. J. HURTU & V. J. HAUTIN,

Assignors, by mesne assignments, to HAUTIN SEWING MACHINE CO.

SEWING MACHINE.

No. 10,125. Reissued May 30, 1882.

Attest:
Courtney A. Cooper
W. L. Ewin.

Auguste Jacques Hurtu
Victor Joseph Hautin
By their attorney
Charles E. Foster

UNITED STATES PATENT OFFICE.

AUGUSTE JACQUES HURTU AND VICTOR JOSEPH HAUTIN, OF PARIS, FRANCE, ASSIGNORS, BY MESNE ASSIGNMENTS, TO HAUTIN SEWING MACHINE COMPANY, OF NEW YORK.

SEWING-MACHINE.

SPECIFICATION forming part of Reissued Letters Patent No. 10,125, dated May 30, 1882.

Original No. 98,064, dated December 21, 1869. Application for reissue filed March 26, 1880. Patented in France June 11, 1867, No. 76,710; and in England June 20, 1867, No. 1,798.

*To all whom it may concern:*

Be it known that we, AUGUSTE JACQUES HURTU and VICTOR JOSEPH HAUTIN, of Paris, France, have invented certain new and useful Improvements in Sewing-Machines; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention consists of certain devices whereby to effect the interlocking of two waxed threads, forming what is termed a "lock-stitch," without bringing the upper or needle thread in contact with the shuttle, or waxing and gumming any operating parts of the mechanism and retaining the wax upon the thread.

The invention further consists of means for positively determining the position of the stitches, and of other features, fully described hereinafter.

Figure 3:
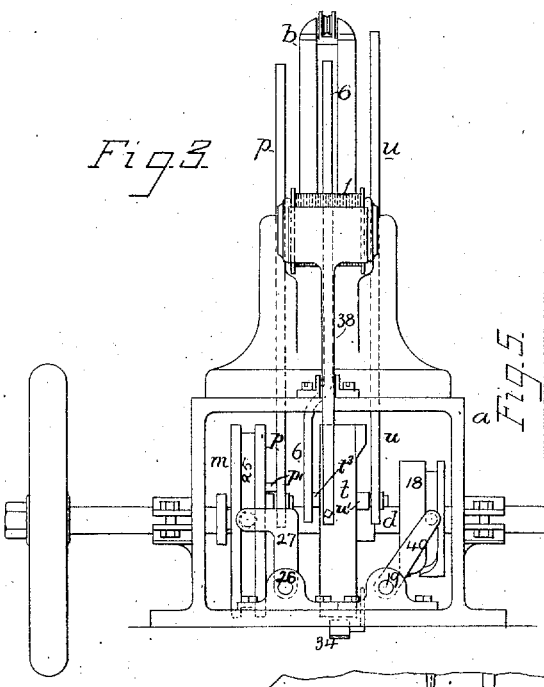
Figure 5:
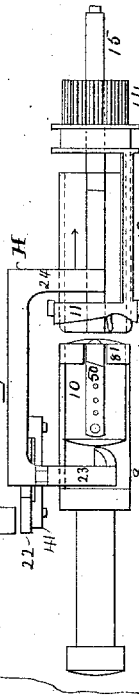
Figure 4A:
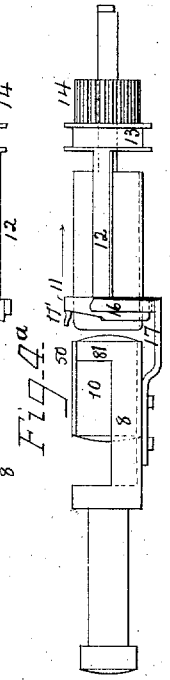
Figure 6:
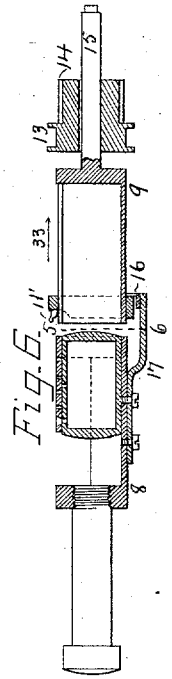
Figure 4:
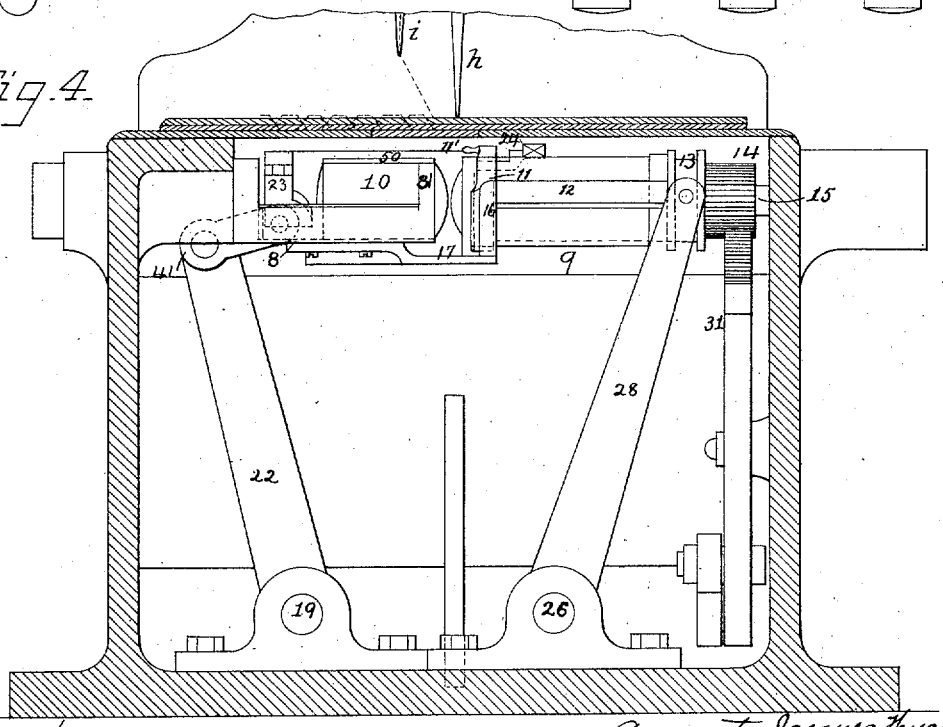
Figure 8:
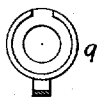
Figure 9:
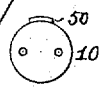
Figure 7:
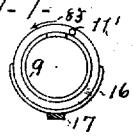
Figure 10:
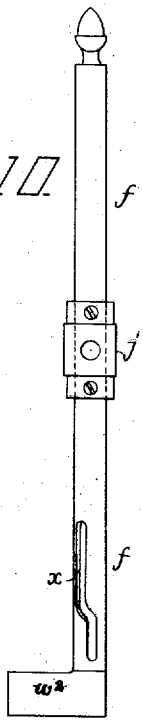

In the drawings forming part of this specification, Figure 1 is a side elevation, partly in section, of an improved machine whereby our mode of sewing with two waxed threads may be carried into effect; Fig. 2, a front elevation of the machine. Fig. $2^a$ is a detached part-sectional view of the head of the presser-bar and its adjuncts; Fig. 3, a back elevation of the machine; Fig. 4, a view, in part section, on the line 1 2, Fig. 1, enlarged; Fig. $4^a$, a side view of the shuttle mechanism on an enlarged scale; Fig. 5, a plan view of part of Fig. 4, showing the shuttle-driver; Fig. 6, a longitudinal section of Fig. $4^a$; Fig. 7, a transverse section on the line 5 6, Fig. 6, looking in the direction of the arrow 33; Fig. 8, a transverse section on the line 5 6, Fig. 6, looking in the opposite direction to the arrow 33, the shuttle being removed. Fig. 9 is an end view of the shuttle; Fig. 10, a view of the awl-carrier detached; and Fig. 11, an enlarged section on the line 7 8, Fig. 1.

The same reference letters and figures serve for all the figures.

The base *a* supports the overhanging arm *b* and work-plate *a'*, and has bearings for the driving-shaft *d*. In the head *c* of the overhanging arm slide and turn the needle-bar *g* and awl-bar *f*, each having a lateral arm, $w^2$, with a socket, in which may be secured detachably the eye-pointed needle *i* or awl *h*. The needle and awl bars and their arms are so constructed and the needle and awl so arranged that by rotating or rocking the bars alternately the needle and awl may be brought successively over the same opening in the work-plate *a'*.

Figure 11:
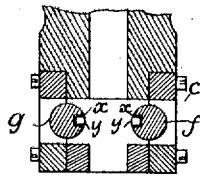

The needle and awl bars have each a cam-groove, *x*, Figs. 10 and 11, into which extends a pin, *y*, from the head *c*, said grooves being so shaped that as the bars are alternately reciprocated vertically they will be also rotated to bring the needle and awl successively into position over the same point in the plate *a'*, and retain this position while passing downward into and upward through the fabric. Each bar *f g* passes through and turns without sliding in a block or slide, *j*, Figs. 1 and 10, which reciprocates vertically in guide-openings *x'* in the head *c*. The block *j* of the awl-bar *f* is connected by a link, *s*, to the operating-lever *p*, which is pivoted at *r* to the arm *b*, and extends to one side of a cam, *m*, Fig. 3, on the shaft *d*, which cam imparts the requisite vibration to the lever by a cam-groove at the inner side of the cam receiving a pin, *p'*, at the side of the lever. The needle-bar is operated in like manner by a lever, *u*, deriving its motion from a cam, *t*, on the shaft *d*, which cam has a groove receiving a pin, *u'*, projecting from the lever.

The presser-bar A carries a foot, (shown as a wheel, B,) and has at the upper end a crank-arm, $C^5$, the vertical portion of which extends into a slot, $s^2$, in the head *c*. A cam-cylinder, C, provided with a spiral upper edge, *s'*, and with a lateral handle, C', turns on the bar A, below the arm $C^5$, and serves by the contact of the spiral edge with the horizontal part of said arm to raise and lower the bar A; and the vertical part of the arm $C^5$ is of such length that when the bar A is lifted to its full extent the arm will be out of the slot $s^2$ and will turn with the bar, and by bearing on the head *c* will hold the bar in its elevated position. When the movement of the cam is reversed the bar is turned until the arm $C^5$ is above the slot $s^2$, into which it will descend, lowering the presser-foot onto the plate. Beneath the work-plate is a shuttle-race, consisting of two sections, 8 9, the former being semi-tubular and the latter tubular, with an intervening space at the point where the needle descends, the section 8 terminating in a ring, 81, split at the top to receive a rib, 50, on the top of a cylindrical shuttle, 10. (See Figs. 5 and 9.) On a shaft, 15, supporting the section 9, turns and slides a pinion, 14, from which extends parallel to the race an arm, 12, supporting at its end a ring or carrier, 11, encircling the section 9, and from which projects the looper 11′. To a bar, 17, projecting from the section 8, is connected a loop-discharge, 16, consisting of a half-ring extending round the ring 11. The pinion 14 gears with a toothed segment, 31, to which a vibrating motion is communicated by a bar, 29, pivoted to the segment and provided with a stud extending into a groove, 30, of the cam *m*. A sliding movement is imparted to the pinion 14 and its attachments by an arm, 28, provided with a stud entering a groove, 13, of the pinion and secured to a rock-shaft, 26, which is operated from a groove, 25, of the cam *m* through the medium of an arm, 27, having a stud entering its said groove.

Another rock-shaft, 19, operated by a cam, 18, on the shaft *d* through the medium of an arm, 40, carries an arm 22, Figs. 1 and 2, connected by a link, 41, to a slide, H, moving on guides on the base *a*, and to the slide is pivoted a finger, 23, which falls behind the shuttle, and a fixed arm, 24, extends from the slide into the slot in the section 9 of the race, the shuttle lying between the arms, which carry it back and forth as the slide H reciprocates. The material is fed by a claw operated by suitable appliances from the driving-shaft.

The driving-cams are constructed and arranged in such a manner that the awl-carrier is at the highest position while the needle-carrier is at the lowest, and vice versa. The grooves *x* are so formed that the awl will first make the hole in the material and then rise and swing to one side, after which the needle will be brought to a position above the awl-opening so as to enter and pass the thread through the same without any change in the position of the material.

The needle-thread bobbin 1 turns on a rod supported in bearings extending from the arm *b*, and a clamp-lever, 38, is caused to bear at intervals on the bobbin by a projection, 37, on the periphery of the cam *t*, against which bears a set-screw, $t^2$, at the end of the lever. The thread passes round the guide-pulleys 2 3 4 to the eye of a take-up, and thence to the needle. The take-up is a reciprocating carrier, 5, provided with a friction-pulley sliding in a slot in the head *c*, and operated by a lever, 6, which derives its motion from a groove in the side of the cam, *t*, a pin, $t^3$, extending from the lever into said groove. The pulley 4 is arranged below the carrier 5, so that the ascent of the take-up 5 will tend to draw the thread upward through the needle. The whole being arranged as described, the action of the shuttle and the mode of forming the stitch without the said shuttle being brought in contact with the loop of waxed thread and without drawing the latter to any material extent over the surface of any part of the machine so as to strip off the wax are as follows: The needle *i* descends in the space between the parts 8 9 and forms a loop. At this moment the carrier 11 slides inward and the looper passes between the needle and thread and seizes the latter, turning so as to form a loop of the needle-thread and coil it upon the periphery of the carrier, distending the loop, but drawing the thread freely so that it does not by its contact with any part strip off the wax. The shuttle then passes from the part 8 to the part 9, through the loop-carrier, and through but without contact with the loop of the waxed thread, which is kept on the exterior surface of the carrier.

After the shuttle-thread has passed through the loop the latter is disengaged from the carrier 11 by a sliding movement of the latter, bringing the loop against the stationary ring 16, while the carrier passes within the ring, the loop being thus thrown off without any tendency to strip off the wax. The loop on being released is contracted by the action of the take-up, drawing a loop of shuttle-thread into the fabric and forming the stitch.

The disk *t* carries a cam-projection, 37, that acts on the lever 38, one end of which bears against the bobbin I at the time the take-up is in operation to prevent the thread from being unwound, so that the stitch of lower thread will be drawn up into the cloth.

It will be seen that by thus positively holding the thread and drawing it up by a take-up having a positive motion, the position of the lock in the fabric is exactly determined. After the loop is drawn up the projection 37 passing from the lever 38 unclamps the latter, and the thread may be delivered freely as it is drawn off by the next rotation of the looper. The pulley 4 is carried by a slide, *f′*, secured adjustably to the head *c*, so that by setting the slide, the extent to which the lock is drawn up into the fabric may be determined with precision.

Instead of winding the shuttle-thread on a bobbin it may be wound into a cylinder, in which shape it will remain, owing to the adhesion of the wax, but without interfering with the ready unwinding, as required, thus utilizing the full capacity of the shuttle.

Any other mode of operating the needle and awl carrier so as to cause the awl and needle to enter the same hole may also be adopted instead of that described.

It will be understood that we reserve the right of varying the mode of transmitting motion and the relative positions of the parts of the apparatus described and illustrated without departing from the principles thereof.

We claim—

1. The combination of the circular carrier, looper, and devices for revolving the same, and ring 16, and operating appliances whereby the loop is thrown off the carrier, substantially as set forth.

2. The combination of the awl and needle carriers, and devices for sliding them and appliances for rotating them to bring the needle and awl successively over the same point in and passing them through the material without moving the latter, substantially as set forth.

3. In a double-thread sewing-machine, the combination of a needle and shuttle, an independent take-up having a positive motion, a gripping device acting positively, and appliances whereby the same is caused to bear against the bobbin at the time the take-up is in operation and prevent the thread from being then unwound, substantially as set forth.

4. The combination, with the gripper and appliances to positively operate it to grip the upper thread and with the positively-moving take-up, whereby the upper thread is drawn up after being interlocked with the lower thread and while it is gripped, of an adjustable device for regulating the extent to which the thread is drawn up by the take-up, as set forth.

In testimony that we claim the foregoing we have hereunto set our hands this 4th day of January, 1875.

AUGUSTE JACQUES HURTU.
VICTOR JOSEPH HAUTIN.

Witnesses:
ROBT. M. HOOPER,
EMILE DUHAN.